United States Patent Office 3,296,355
Patented Jan. 3, 1967

3,296,355
FURNACE FOR THE MANUFACTURE OF FISSILE AND/OR FERTILE NUCLEAR FUEL CARBIDES
Pierre Beucherie, Biandronno, Varese, and Joseph G. Wurm, Varese, Italy, assignors to European Atomic Energy Community-Euratom, Brussels, Belgium
Filed July 14, 1964, Ser. No. 382,500
Claims priority, application Germany, July 5, 1963, E 25,103, E 25,104
7 Claims. (Cl. 13—26)

The present invention relates to a furnace for the manufacture of fissile and/or fertile nuclear fuel carbides or which enables the recuperation of such carbides by means of a process whereby the nuclear fuel, halogenated under the effect of heat produced in the furnace hearth in which it is placed, reacts with a reducing metal and with carbon necessary for the carburization, these three components of the reaction being well mixed and placed in the heart of the furnace.

The above-mentioned process relating to the manufacture of nuclear fuel carbides presents considerable advantages for the manufacture of uranium carbides. According to this synthesis, it is no longer necessary to effect a preliminary preparation of a starting pure metal (or the hydrogenaton of the metal) so as to obtain uranium carbide. Consequently, a number of operational steps, which are expensive and necessary in the classical process, are eliminated. Furthermore, according to the invention, it becomes now possible to perform the synthesis of the desired final product directly following a halogenation operation intended for the regeneration of the irradiated nuclear fuel. In this case, the regeneration and the synthesis are interconnected with each other. Also, according to the instant invention, it becomes possible to have the synthesis of the final product (in the present case uranium carbide) followed by an isotope enrichment process based on $UF_6$ or $UF_4$.

The recuperation of fissile or fertile nuclear fuel carbides, according to this process, presents the advantage that, in order to obtain the fuel carbide, it is not required to pass by the oxide and by the metal.

The furnace enabling to carry out the process of manufacture of uranium carbides is characterized, according to this invention, in that it operates under vacuum or in an atmosphere of protective gas and that it comprises, above the furnace hearth where the reaction takes place, cooling surfaces adapted to collect and condense the volatile halogenides of the reducing metals which are formed during the reaction.

Figure 1:
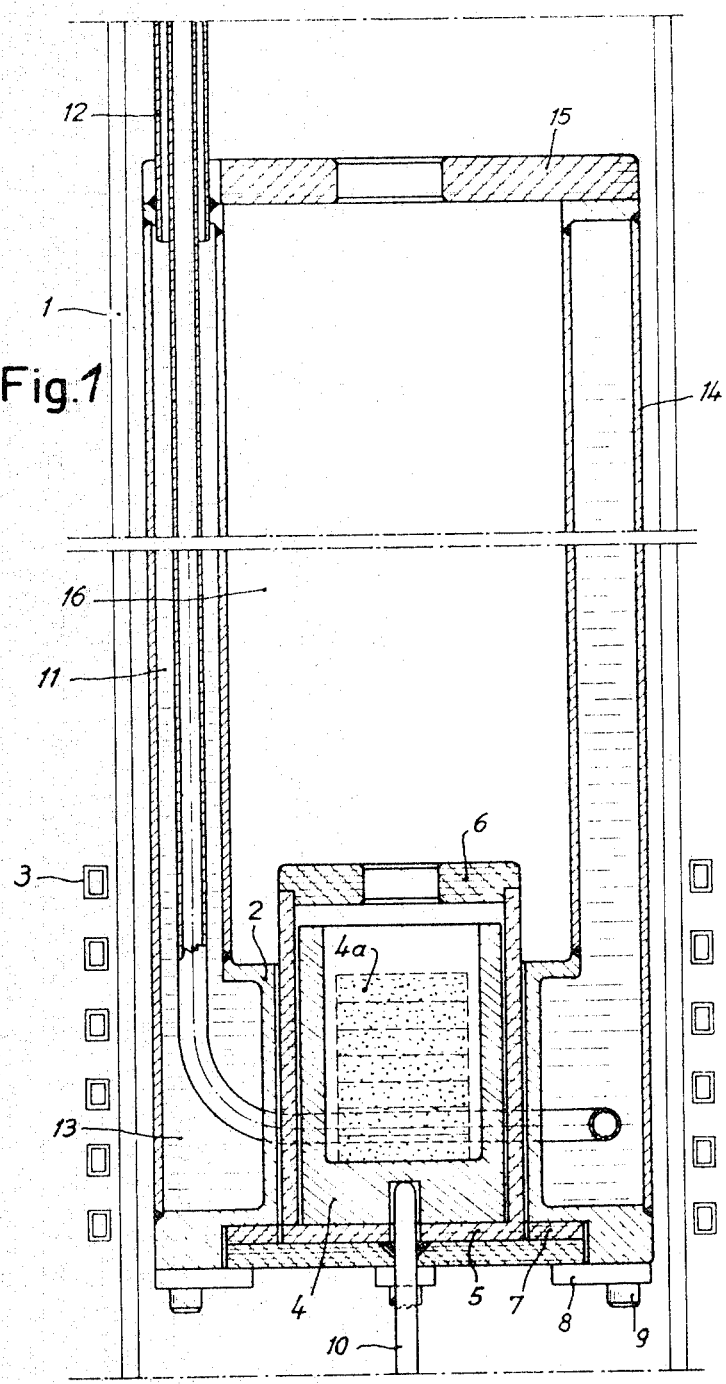
Figure 2:
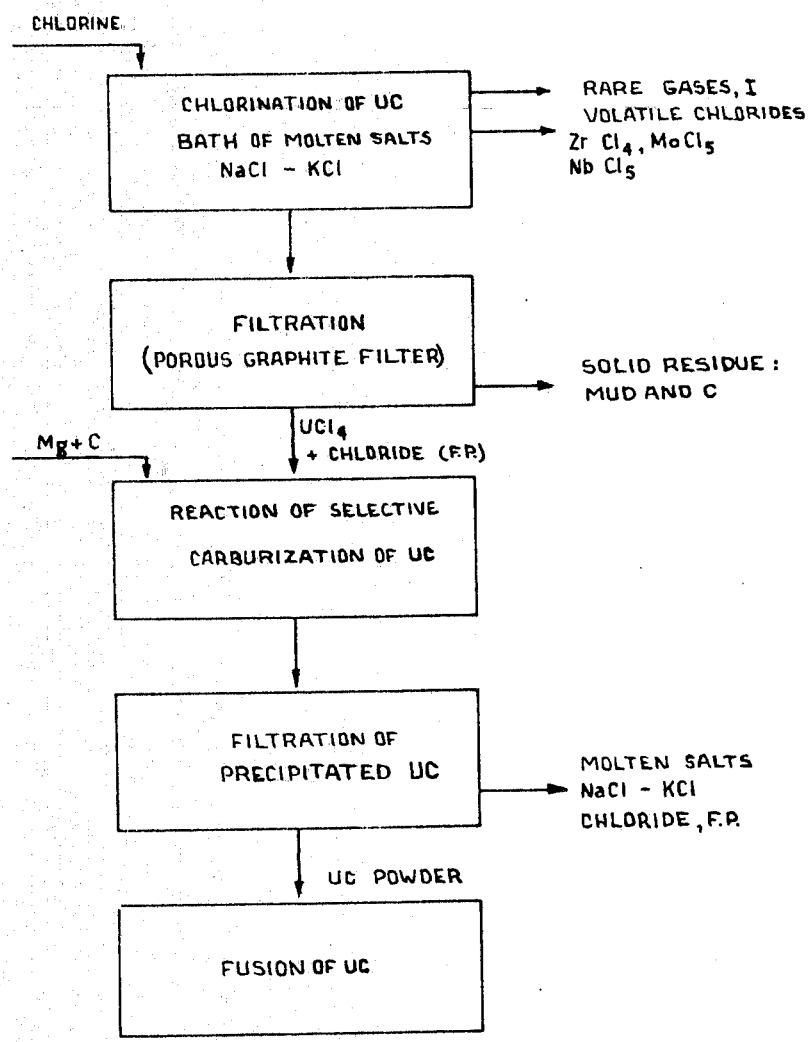
Figure 3:
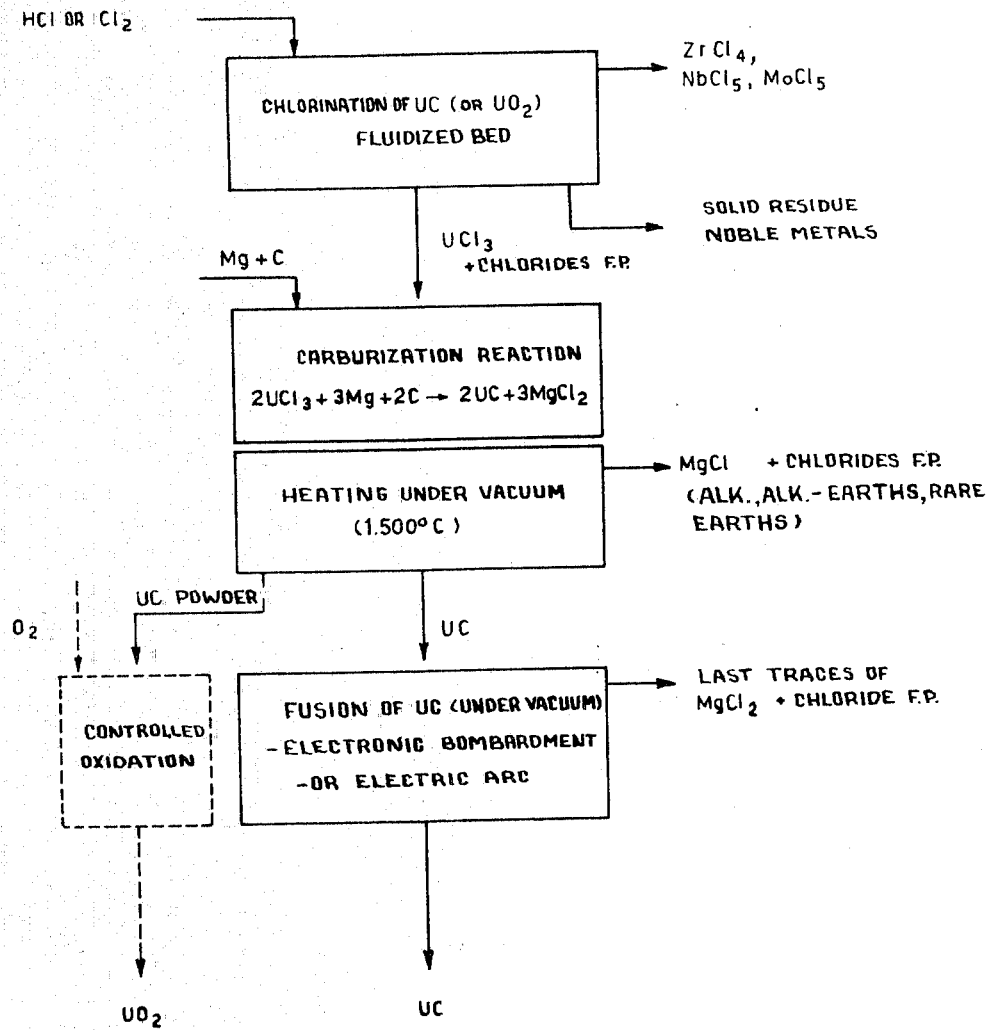

This invention will now be described in greater detail with reference to the appended drawings in which:

FIG. 1 is a section view in elevation of a furnace according to the present invention; and FIGS. 2 and 3 schematically represent the regeneration of a ceramic fuel and the synthesis of a uranium carbide.

It is to be noted that the diagram shown in FIG. 2 is only applicable to the manufacture of uranium carbide while that in FIG. 3 can be applied both to the manufacture of uranium carbide and of uranium oxide.

The furnace according to the instant invention is a high frequency induction furnace provided with a field concentrating device and positioned in a transparent quartz tube. At its upper end, the quartz tube is closed by a clamp provided with an observation prism while at its bottom end this tube is integral with a connecting vessel in the form of T and provided with a support for vacuum pumps.

In FIG. 1, the references have the following meanings:
1 is the quartz tube; 2 is the field concentrating device; 3 an induction coil; 4 the hearth of the furnace (in graphite) comprising a charge 4a; 5 is a vessel-support made of a refractory and electrically insulating material and intended to receive the furnace hearth 4; 6 is a removable cover of the vessel 5, which cover is provided with an aperture permitting gas passage; 7 is a closing plate supporting the vessel 5 and the hearth 4, made of a refractory and insulating material, said plate being removably fixed on the field concentrating device 2 by means of a flange 8 and a screw 9. A thermo-element 10 is fixed on the plate 7, the sensitive end of this thermo-element penetrating into a cavity provided in the bottom of the insulating vessel 5 and the furnace hearth 4. The cooling conduits 11 and 12 enable passage of water through the cooling chamber 13 of the field concentrating device 2 and through the upper part of said device which part serves as a condensation dome 14.

The condensation dome 14 is made in such a manner that the field concentrating device 2, which is longitudinally split for electrical reasons, is connected by its upper part to a hollow cylinder which is also split. In this manner, the concentrating device and the condensation dome constitute but one unit. Evidently, the split is filled with a refractory and electrically insulating material. The halogenides which are formed during the exchange reaction are deposited on the internal wall of the dome (i.e. of the condenser) at its upper end, and the dome 14 is closed by a removable cover 15 made of refractory and insulating material and having an opening to permit gas passage. The dimensions of the unit comprising the field concentrating device and the condenser are approximately 95 mm. in diameter and 300 mm. in height. In practice, this unit constitutes, within the furnace space (i.e. the quartz tube 1), a separate chamber 16 in which the reactions take place. This reaction chamber, of a small volume, communicates with the rest of the furnace space only by the opening provided in the cover 15 of the condenser 14 and consequently can be controlled with regard to the different parameters of the operation in an easier manner than the large volume of the furnace. Thus, in spite of the salt vapours which are formed, the temperature of the hearth can be easily varied during and after the exchange reaction, a good condensation can be obtained and a deep vacuum can be maintained. Furthermore, the ionized salt vapours cannot reach the field of the coil within the unit comprising the concentrating device and the condenser and thus disturb its electrical working (which consists in leading the field to the walls of the hearth). Finally, the chlorinated radioactive fission products are retained in the dome of the condenser and do not reach the pumping installation of the furnace.

The process which is schematically indicated on FIG. 2 is characterized in that the halogenation of the fuel is carried out in a bath of molten salt and that the non volatile components produced during the halogenation reaction as well as during the carburization reaction which follows, which components are to be eliminated, are separated from the bath by filtration after each reaction. The regeneration process schematically indicated in FIG. 3 is characterized in that the halogenation of the fuel is effected in a fluidized bed, that the separation of the volatile and non volatile components is carried out in a dust cyclone and that the carburization is effected in the hearth of the furnace according to the invention. The common characteristic of these processes consists in that, as it has already been mentioned, it is not necessary to pass by an operational step utilizing the oxide or the metal to recuperate the nuclear fuel carbide.

According to the process of manufacture and regeneration schematically represented in FIG. 2, there is added spent irradiated uranium carbide to a bath of molten salt NaCl-KCl contained in the hearth of a furnace. The bath temperature is in the order of 700° C. Then, for the halogenation, hydrochloric acid is introduced into the bath. There is thus formed uranium tetrachloride ($UCl_4$) as well as the chlorides of other metallic components of the nuclear fuel particularly those of the fission products (as long as these products are not noble). The rare gases (Xe, Ar, Kr) as well as the volatile metallic chlorides such as $ZrCl_4$, $MoCl_5$, $NbCl_5$ escape. The non volatile chlorides, that is the alkaline, the alkaline-earth and the rare earth chlorides are dissolved in the bath together with the desired uranium tetrachloride. The noble metals are dissolved at the bottom of the hearth. Free carbon floats on the surface of the bath as slag. In order to separate the bottom deposits and the slag from the other constituents of the bath, the bath contents are filtered through porous graphite at a temperature in the order of 800° C. The filtrate consisting of chlorides (or uranium and fission products) is introduced at room temperature into the hearth of a furnace according to the instant invention. To this charge there is added a tablet consisting of magnesium and graphite powder mixed according to desired stoichiometric proportions, then the furnace is heated to start the exchange reaction.

The uranium carbide is formed by selective precipitation. This carbide is separated from the bath of molten salt and from other carbides by means of another filtration through porous graphite. In the last phase of the process according to FIG. 2, the residue powder consisting of uranium carbide is re-melted under vacuum.

In the case of the hereinabove described process for manufacturing uranium carbide starting with a molten bath, the temperature of the bath is never higher than from 100° C. to the melting temperature of said bath. Consequently, volatilization of the chlorides is not desired. On the contrary, there is evaporation of the chlorides in the case of the process of manufacture and regeneration of uranium carbide represented schematically in FIG. 3.

The process, according to FIG. 3, is first of all distinct from that shown in FIG. 2 by the fact that the chlorination is here a reaction between a solid body and a gas. Generally, the fuel containing the uranium carbide is introduced in solid pieces into a fluidized bed which, first of all, is fed with hydrochloric acid and then with a mixture of chlorine and argon. During this reaction, apart from uranium trichloride or uranium tetrachloride and the non volatile chlorides of the fission products, there are formed volatile chlorides such as $ZrCl_4$, $NbCl_5$, $MoCl_5$ as well as the rare gases which are evacuated from the fluidized bed. The non halogenated noble metals are deposited at the bottom of the bed. The uranium chloride as well as the non volatile chlorides of the fission products are separated from the fission gases by means of a dust cyclone.

The halogenation is carried out in such a way that no uranium chloride having valences higher than 4 is obtained. This is possible since the chlorides such as $ZrCl_4$, $NbCl_5$ etc. are already volatile at the moment of formation of the solid tetravalent uranium chloride and can therefore be easily separated from the latter. Furthermore, the uranium tetrachloride or better still the uranium trichloride is entirely suitable for the carburization reaction. The usual, up to now employed procedure utilizing volatile uranium hexachloride is much too complicated for the carburization. In this case, it would be necessary to have an intermediate reduction phase using hydrogen.

However, the uranium tetrachloride thus obtained is still mixed with the chlorides of fission products, that is the chlorides or rare earths, of alkaline earths and of alkali. The uranium tetrachloride is separated from these compounds by the carburization which selectively acts only on the uranium carbide. For the carburization, the mixture of powdered chloride thus obtained is introduced into the hearth of the furnace and mixed with magnesium and graphite is appropriate stoichiometric proportions and which are used in the form of powder or tablets. By heating the whole under vacuum or in an argon atmosphere, peferably according to a process which will be described hereinunder for a synthesis of uranium carbide, the uranium chloride is transformed into uranium carbide which is deposited in the hearth as a spongy powder while $MgCl_2$ and the chlorides of the fission products are first evaporated and then deposited on the cooling surfaces of the furnace.

The so obtained uranium carbide in powder form can then be re-melted under vacuum, for instance by means of an electronic bombardment or an electric arc. This operation constitutes an additional purification whereby the last traces of the chlorides of Mg and of fission products are eliminated. However, the uranium carbide product can equally be used for the manufacture of uranium dioxide $UO_2$, according to a known oxidation process, as it is also indicated in FIG. 3. As a matter of fact, the process according to FIG. 3 can also be integrally used under its present form for the regeneration of $UO_2$ since the oxygen already disappears in the chlorination phase and can easily be added to uranium in the final phase (the oxidation phase of said process).

The essential phases of the synthesis of uranium carbide are the following: the constituents of the reactions in powdered form, namely $UCl_3$, Mg and C are mixed, then a quantity of this mixture corresponding to one charge of the furnace hearth is taken and put in a polyethylene bag which is compressed at a pressure of about 10 kg./$cm.^2$ so as to obtain a tablet. Then the bag is removed and the tablet placed in the hearth of the furnace. The furnace is brought under vacuum of about $10^{-6}$ mm. of Hg and is then degasified. This phase is followed by the thermal treatment itself which enables to carry out the exchange reaction. It is performed either in an argon atmosphere or under vacuum. When argon atmosphere is used, the tablet is first heated to 700° C. in 20 minutes. The gas pressure is of 1 atmosphere absolute.

The exchange reaction starts to set up at a temperature in the order of 200 to 300° C. and ends at a temperature in the order of 700° C. After having maintained the tablet at a constant temperature during 20 minutes, this tablet is brought to a temperature of 1050° C. at the same heating speed as mentioned above. When this temperature is reached the pressure should start to be decreased and the heating should be continued until a temperature in the order of 1200° C. is achieved. The temperature of 1200° C. is reached after a total operating duration of 1 hour. At this instant the pressure of argon should have diminished to $10^2$ mm. of Hg.

In the temperature range comprised between 1050 and 1200° C. the chloride of Mg is evaporated, Now, the pressure is again decreased to $10^{-4}$ mm. of Hg. During this decrease of pressure, the temperature is maintained at a constant value of 1200° C. during 40 minutes. Due to this operational phase the uranium carbide remains in the hearth as a spongy fine grained product. Then, the temperature is again slightly increased (during 20 minutes) and the pressure is decreased to $10^{-5}$ mm. of Hg in order to purify and homogenize the uranium carbide in powder form for the last time. Then, it is advantageous to increase the temperature to 1500° C. in order to contact and render denser the obtained uranium carbide by means of such roasting. This also has for effect the detachment of uranium carbide from the wall of the hearth.

It is to be understood that the embodiments of the present invention given above in the way of examples do not restrict this invention and that many modifications evident to those skilled in the art can be performed without departing from the spirit of the invention and the scope of the following claims.

We claim:
1. A high frequency induction furnace for the manu- facture of nuclear fuel carbides or the recuperation thereof comprising: a central open top hearth into which the reaction components are to be introduced; said hearth being positioned within a supporting vessel having a cover with an aperture for gas passage; a field concentrating device including a body with hollow walls surrounding said supporting vessel and adapted to lead the field to the walls of the hearth; said body being closed at its bottom end to form a support for said supporting vessel and extending towards the top to form a condensation dome with hollow walls; said hollow walls of said body and dome being provided with a cooling medium; a quartz tube surrounding said field concentrating device; and induction heating means including an induction coil surrounding the quartz tube in the vicinity of the hearth.

2. A furnace as claimed in claim 1, in which a removable cover is provided to close the top of the condensation dome; said cover being made of refractory and insulating material and having an opening to permit gas passage.

3. A furnace as claimed in claim 1, in which the hearth is made of graphite and is positioned within the supporting vessel which is made of a refractory and electrically insulating material.

4. A furnace as claimed in claim 1, in which a thermo-element is provided, the sensitive end of this thermo-element penetrating into a cavity in the bottom of the hearth.

5. A furnace as claimed in claim 1, further provided with means to produce a vacuum within the space defined by the quartz tube.

6. A furnace as claimed in claim 1, further provided with means to fill the space defined by the quartz tube with a protective gas.

7. A furnace as claimed in claim 1, in which the quartz tube is transparent and is closed at its upper end by a clamp provided with an observation prism while at its bottom it is integral with a connecting vessel in the form of T and provided with a support for vacuum pumps.

References Cited by the Examiner
UNITED STATES PATENTS

| | | | |
|---|---|---|---|
| 1,378,189 | 5/1921 | Northrup | 13—26 |
| 2,308,945 | 1/1943 | Embden | 13—26 |
| 2,359,578 | 10/1944 | Payne | 13—26 |
| 2,402,582 | 6/1946 | Scaff | 13—26 X |
| 2,780,666 | 2/1957 | Scriver | 13—26 |
| 3,036,888 | 5/1962 | Lowe | 13—26 X |
| 3,123,435 | 3/1964 | Miller et al. | 23—14.5 |
| 3,154,378 | 10/1964 | Schneider et al. | 23—14.5 |

RICHARD M. WOOD, *Primary Examiner.*

BENJAMIN R. PADGETT, *Examiner.*

L. H. BENDER, M. J. SCOLNICK, *Assistant Examiners.*